United States Patent
Sano et al.

(10) Patent No.: US 7,384,466 B2
(45) Date of Patent: Jun. 10, 2008

(54) INK SET AND INKJET RECORDING METHOD AND RECORDED MATTER USING THE INK SET

(75) Inventors: Tsuyoshi Sano, Nagano-ken (JP); Takeshi Tanoue, Nagano-ken (JP); Kiyohiko Takemoto, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 14 days.

(21) Appl. No.: 11/454,163

(22) Filed: Jun. 15, 2006

(65) Prior Publication Data

US 2007/0046748 A1    Mar. 1, 2007

(30) Foreign Application Priority Data

Sep. 1, 2005   (JP) .............................. 2005-253060

(51) Int. Cl.
C09D 11/02 (2006.01)
B41J 2/01 (2006.01)

(52) U.S. Cl. ............... 106/31.6; 106/31.86; 106/31.89; 347/100

(58) Field of Classification Search ............... 106/31.6, 106/31.86, 31.89; 347/100
See application file for complete search history.

(56) References Cited

U.S. PATENT DOCUMENTS

| | | | | |
|---|---|---|---|---|
| 7,135,208 B2 * | 11/2006 | Kubota | ......................... | 427/256 |
| 2003/0116055 A1 * | 6/2003 | Kubota et al. | ............ | 106/31.27 |
| 2003/0226473 A1 * | 12/2003 | Ishimoto | .................... | 106/31.6 |
| 2004/0017406 A1 * | 1/2004 | Kato et al. | ...................... | 347/1 |
| 2004/0024086 A1 * | 2/2004 | Segawa et al. | ............. | 523/160 |
| 2005/0039632 A1 * | 2/2005 | Yamamoto et al. | ....... | 106/31.27 |
| 2006/0075925 A1 * | 4/2006 | Stoffel et al. | ............. | 106/31.27 |
| 2008/0047463 A1 * | 2/2008 | Tanoue et al. | ............. | 106/31.6 |

FOREIGN PATENT DOCUMENTS

| | | |
|---|---|---|
| JP | 62-1426 | 1/1987 |
| JP | 3-56573 | 3/1991 |
| JP | 3-79678 | 4/1991 |
| JP | 3-160068 | 7/1991 |
| JP | 4-18462 | 1/1992 |
| JP | 2001-354886 | 12/2001 |
| JP | 2003-238857 | 8/2003 |
| WO | WO 2005/111159 | * 11/2005 |

OTHER PUBLICATIONS

Computer-Generated English Translation of Specification and Claims and Patent Abstracts of Japan of JP 2003-238857 dated Aug. 27, 2003.
Computer-Generated English Translation of Specification and Claims and Patent Abstracts of Japan of JP 2001-354886 dated Dec. 25, 2001.
Patent Abstracts of Japan of JP 4-18462 dated Jan. 22, 1992.
Patent Abstracts of Japan of JP 3-160068 dated Jul. 10, 1991.
Patent Abstracts of Japan of JP 3-79678 dated Apr. 4, 1991.
Patent Abstracts of Japan of JP 3-56573 dated Mar. 12, 1991.

* cited by examiner

*Primary Examiner*—Helene Klemanski
(74) *Attorney, Agent, or Firm*—Ladas and Parry LLP

(57) ABSTRACT

An ink set includes at least a magenta ink composition and a light magenta ink composition. The light magenta ink composition is formed with a pigment density lower than a pigment density of the magenta ink composition. A pigment used in the magenta ink composition is C.I. Pigment Violet 19, and a pigment used in the light magenta ink composition is C.I. Pigment Red 122.

10 Claims, No Drawings

INK SET AND INKJET RECORDING METHOD AND RECORDED MATTER USING THE INK SET

CROSS-REFERENCES TO RELATED APPLICATIONS

The entire disclosure of Japanese Patent Application No. 2005-253060, filed on Sep. 1, 2005, is expressly incorporated herein by reference.

BACKGROUND

1. Technical Field

The present invention relates to an ink set and to an inkjet recording method and recorded matter using the ink set, and particularly relates to an ink set featuring excellent granularity and to an inkjet recording method and recorded matter that use this ink set.

2. Related Art

An inkjet recording method is a printing method which causes droplets of an ink composition to fly and adhere to a recording medium, such as paper or the like, to perform printing. Such a method features the characteristics of being capable of printing high-resolution, high-quality images at high speeds with a comparatively inexpensive apparatus.

In recent years, for such inkjet recording methods, ink sets formed of pluralities of color ink compositions have been constituted and the formation of color images has been performed therewith. Commonly, formation of color images is performed using: an ink set including three colors—a yellow ink composition, a magenta ink composition and a cyan ink composition; an ink set including four colors, with a black ink composition in addition to the above-mentioned colors; an ink set including colors other than those four colors, as secondary colors; an ink set including ink compositions (dark and light inks) which, while matching in color, have a variety of chromatic categories varying in shade (colorant density); or the like.

For example, as an ink set including colors other than the above-mentioned four colors as secondary colors, an aqueous pigment ink set for inkjets which features high color reproduction, color saturation and glossiness has been proposed (JP-A-2001-354886). This ink set is provided with a yellow ink composition, a magenta ink composition, a cyan ink composition and a black ink composition, and, in addition to those four colors, a green ink composition and a red ink composition.

As an ink set which includes dark and light ink compositions, an ink set has been proposed (JP-A-2003-238857) which is provided with two black ink compositions with different pigment densities and which improves color reproduction without adversely affecting granularity of low brightness portions.

However, with previous ink sets, a tendency for granularity of the recording images that are printed to be degraded has been apparent. Accordingly, various means for improving granularity have been tried, but the fact is that as yet images of sufficient quality have not been obtained.

SUMMARY

Accordingly, an object of the invention is the provision of an ink set featuring excellent granularity, and an inkjet recording method and recorded matter which use this ink set.

The present inventors have discovered, as a result of diligent investigations, that it is possible to provide an ink set featuring excellent granularity, for an ink set including light and dark ink compositions, by taking particular respectively different pigments as colorants to be used in the light and dark ink compositions. The invention is based on this finding and an aspect of the invention provides an ink set including at least a magenta ink composition and a light magenta ink composition, the light magenta ink composition being formed with a pigment density lower than a pigment density of the magenta ink composition. A pigment used in the magenta ink composition is C.I. Pigment Violet 19, and a pigment used in the light magenta ink composition is C.I. Pigment Red 122. Thus, an ink set with excellent granularity can be provided.

A preferable aspect of the invention is as follows. It is preferable if a ratio of density of the C.I. Pigment Violet 19 used in the magenta ink composition to density of the C.I. Pigment Red 122 used in the light magenta ink composition is in the range 4:3 to 14:1. The granularity can be further improved by the ratio being in this range.

A further aspect of the invention provides an inkjet recording method for performing printing, the method including ejecting droplets of ink compositions and causing the droplets to adhere to a recording medium. This inkjet recording method features use of the ink set described above.

Still another aspect of the invention provides recorded matter, which has been recorded by recording which includes at least one of using the ink set described above and the inkjet recording method described above.

DESCRIPTION OF EXEMPLARY EMBODIMENTS

As described above, an ink set of the invention is an ink set which is provided with at least a magenta ink composition and a light magenta ink composition, which is constituted with a pigment density lower than a pigment density of the magenta ink composition. A pigment used in the magenta ink composition is C.I. Pigment Violet 19, and a pigment used in the light magenta ink composition is C.I. Pigment Red 122.

An addition amount of pigment in the magenta ink composition is preferably 1.5 to 10% by weight, and more preferably 2 to 7% by weight. An addition amount of pigment in the light magenta ink composition is preferably 0.01 to 2% by weight, and more preferably 0.5 to 1.5% by weight. It is preferable if a ratio of density of the C.I. Pigment Violet 19 in the magenta ink composition to density of the C.I. Pigment Red 122 in the light magenta ink composition is between 4:3 and 14:1.

For the ink compositions to be employed in the invention, it is preferable if these pigments are added to the inks in the form of pigment dispersions obtained by dispersing the pigments in aqueous mediums, with a resin or surfactant acting as a dispersant. As a resin to serve as a dispersant, a resin which is commonly used for preparing pigment dispersions, for example, a polymer resin, can be employed. Such dispersants may be added to the ink compositions rather than forming the pigment dispersions.

As the polymer resin, (meth)acrylic resins, vinyl acetate-based resins, styrene-butadiene-based resins, vinyl chloride-based resins, (meth)acryl-styrene-based resins, butadiene-based resins, styrene-based resins, cross-linked (meth)acrylic resins, cross-linked styrene resins, benzoguanamine resins, phenol resins, silicone resins, epoxy resins and the like are mentioned. Of these, a (meth)acryl-styrene-based resin is particularly preferable.

The (meth)acryl-styrene-based resin, moreover, is preferably water-soluble, a molecular weight thereof is preferably 1,000 to 15,000 and particularly preferably 3,000 to 10,000, and an acid value thereof is preferably 50 to 200 and particularly preferably 70 to 150.

Resin addition amounts (solid content equivalent) are weights in ranges such that, of weight ratios relative to the pigments, the weight ratio in the magenta ink composition is lower than the weight ratio in the light magenta ink composition, and are not particularly limited within such ranges. However, ordinarily, in the case of the magenta ink composition, for 100 parts by weight of the pigment, 10 to 100 parts by weight of the resin will be added, more particularly 20 to 80 parts by weight, and in the case of the light magenta ink composition, for 100 parts by weight of the pigment, 10 to 100 parts by weight of the resin will be added, more particularly 20-100 parts by weight.

As the surfactant to serve as a dispersant, anionic surfactants (for example, sodium dodecylbenzenesulfonate, sodium laurylate, an ammonium salt of polyoxyethylene alkylethersulfate and the like) and non-ionic surfactants (for example, a polyoxyethylene alkyl ether, polyoxyethylene alkyl ester, polyoxyethylene sorbitane fatty acid ester, polyoxyethylene alkylphenyl ether, polyoxyethylene alkyl amine, polyoxyethylene alkyl amide and the like) are mentioned. Further, acetylene glycols (OLFINE Y and STG, and SURFYNOL 82, 104, 440, 465 and 485 (each manufactured by Air Products and Chemicals, Inc.)) and the like can be employed. These can be used singly or two or more mixed for use.

An addition amount of the surfactant, in the ink composition of either of the magenta ink and the light magenta ink, is preferably 0.05 to 5% by weight, and more preferably 0.1 to 1.5% by weight.

The magenta ink and light magenta ink compositions of the invention each may include a resin emulsion which employs the resin mentioned above as the dispersed phase and employs water as the continuous phase. For the resin, a polymer having a combination of hydrophilic portions and hydrophobic portions may be employed. A grain diameter of this resin is not particularly limited as long as the emulsion is formed, but 150 nm or less is preferable, and 5 to 100 nm is more preferable.

These resin emulsions each may be provided by dispersing and polymerizing a resin monomer in water together with, depending on the case, a surfactant. For example, an emulsion of a (meth)acrylic resin or a styrene-meth)acrylic resin can be obtained by dispersing and polymerizing a (meth)acrylic ester or a (meth)acrylic ester and styrene in water with a surfactant. It is preferable if a mixing ratio (weight ratio) of the resin component(s) and the surfactant is between 10:1 and 5:1. When a usage amount of the surfactant is in this range, an ink composition with satisfactory water-resistance and permeability will be provided. The surfactant is not particularly limited, but the above-mentioned surfactants can be mentioned as preferable examples.

A ratio of the resin serving as the dispersed phase component and the water serving as the continuous phase component is preferably 60 to 400 parts by weight of water for 100 parts by weight of resin, and more preferably 100 to 200 parts by weight of water.

As such resin emulsions, it is possible to utilize publicly known resin emulsions. For example, the resin emulsions described in JP-B-62-1426, JP-A-3-56573, JP-A-3-79678, JP-A-3-160068, JP-A-4-18462 and the like can be utilized without modification.

It is further possible to utilize commercially available resin emulsions. Examples include MICROGEL E-1002 and E-5002 (styrene-acrylic resin emulsions, manufactured by Nippon Paint Co., Ltd.), VONCOAT 4001 (an acrylic resin emulsion, manufactured by Dainippon Ink and Chemicals, Incorporated), VONCOAT 5454 (a styrene-acrylic resin emulsion, manufactured by Dainippon Ink and Chemicals, Incorporated), SAE-1014 (a styrene-acrylic resin emulsion, manufactured by Zeon Corporation), SAIBINOL SK-200 (an acrylic resin emulsion, manufactured by Saiden Chemical Industry) and the like.

It is preferable if the magenta ink and light magenta ink compositions each includes the resin emulsion such that the resin component thereof constitutes 0.1 to 40% by weight of the ink composition, more particularly 1 to 25% by weight. The resin emulsion has effects of inhibiting permeation of the pigment that serves as a colorant and promoting fixing to a recording medium. Furthermore, depending on the type of resin emulsion, a film may be formed at the surface of an ink image on a recording medium, improving abrasion resistance of the printed matter.

It is preferable if the magenta ink and light magenta ink compositions each includes a thermoplastic resin in a resin-emulsion state. Here, a thermoplastic resin means a resin whose softening temperature is, ordinarily, 50 to 250° C., 60 to 200° C. being preferable. Here, the term softening temperature encompasses the lowest temperature of: a glass transition point of the thermoplastic resin, a melting point thereof, a temperature at which the viscosity ratio thereof reaches 1011-1012 poise, a flow point thereof, and a minimum film-formation temperature (MFT) thereof when the resin is in a state of resin emulsion. In a heating step of a method of recording a printed image using the ink set of the invention, the recording medium will be heated to a temperature of at least the softening temperature of the thermoplastic resin. It is preferable if, when these resins are heated to at least the softening or melting temperatures thereof and then cooled, the resins form hard, water-resistant, abrasion-resistant films.

In the ink compositions to be employed in the ink set of the invention, instead of the above-described pigments and dispersants, it is possible to use a "self-dispersing pigment" rather than using a dispersion polymer. A self-dispersing pigment is capable of dispersal and/or dissolution in water without a dispersant, due to a group which provides direct dispersibility having been chemically introduced to surfaces of particles of the pigment.

The aqueous medium includes water, with an aqueous organic solvent and various additives and the like. When water is used as the aqueous medium, the water is added to the ink compositions of the magenta ink and the light magenta ink to make up the balance of the respective components. As the aqueous organic solvent and various additives, a permeation accelerant, a wetting agent, a pH regulation agent and the like can be mentioned.

The permeation accelerant is preferable for enhancing infiltration into a recording medium and raising permeability of an organic pigment. Examples of permeation accelerants include: various kinds of surfactants, such as cationic surfactants, anionic surfactants, non-ionic surfactants and the like; alcohols, such as methanol, ethanol, isopropyl alcohol and the like; lower alkyl ethers of polyalcohols, such as ethylene glycol monomethyl ether, diethylene glycol monoethyl ether, diethylene glycol monobutyl ether, triethylene glycol monobutyl ether, prolene glycol monobutyl ether and the like; and diols, such as 1,2-pentane diol, 1,2-hexane diol and the like. One or two or more of these may be used. In particular, using a diol such as 1,2-hexane diol or the like is preferable.

In the ink compositions, the permeation accelerant is preferably around 0.1 to 20% by weight, more preferably around 3 to 15% by weight.

As a preferable example of the permeation accellerant, a 1,2-alkane diol and/or a silicon-based surfactant are mentioned.

As the silicon-based surfactant, a polyether-denatured organosiloxane-type compound represented by the following general formula (1) can be mentioned.

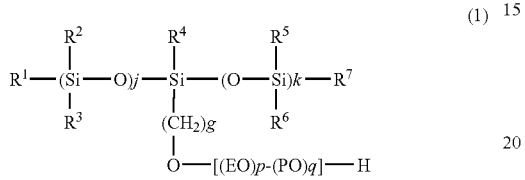

(1)

(In the formula, $R^1$ to $R^7$ are respectively independently $C_{1-6}$ alkyl groups, j, k and g are respectively independently integers of at least 1, EO is an ethyleneoxy group, PO is a propyleneoxy group, and p and q are integers of at least 0. p+q is an integer of at least 1, and EO and PO, regardless of the order in the square brackets, may be randomly arranged and may be in blocks.)

As the 1,2-alkane diol, diols with carbon numbers of 4 to 6, for example, 1,2-butane diol, 1,2-pentane diol or 1,2-hexane diol, are mentioned. 1,2-pentane diol and 1,2-hexane diol are preferable, and 1,2-hexane diol is more preferable. These can be used singly or in a combination of two or more.

With regard to an addition amount of the 1,2-alkane diol, a range of around 0.1 to 20% by weight relative to the ink composition is preferable, around 3 to 15% by weight is more preferable, and 5 to 10% by weight is even more preferable.

For the polyether-denatured organosiloxane-type compound represented by the above general formula (1), it is preferable if $R^1$ to $R^7$ are independently alkyl groups with carbon numbers of 1 to 6, methyl groups being preferable. While j, k and g are independently integers of at least 1, values of 1 to 2 are more preferable. Furthermore, while p and q are integers of at least 0, p+q is an integer of at least 1.

More preferable examples of the polyether-denatured organosiloxane-type compound represented by general formula (1) include compounds which satisfy the condition j=k+1, compounds in which $R^1$ to $R^7$ are all methyl groups, j is 2, k is 1, g is 1, p is an integer of at least 1 and q is 0, and the like.

Compounds are commercially available which are represented by general formula (1), and it is possible to use these compounds. For example, silicon-based surfactants BYK-345, BYK-346, BYK-347 and BYK-348, marketed by BYK Chemie Japan KK, can be used.

An addition amount of the polyether-denatured organosiloxane-type compound can be suitably determined, a range of around 0.01 to 1.0% by weight relative to the ink composition being preferable, and around 0.3 to 0.8% by weight being more preferable.

As other preferable examples of the permeation accellerant, a polyalcohol lower alkyl ether (glycol ether) and/or an acetylene glycol-type surfactant represented by the following general formula (2) can be mentioned.

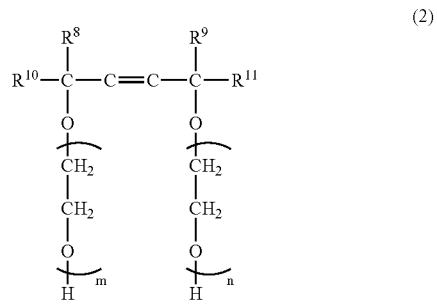

(2)

(In the formula, $0 \leq m+n \leq 30$, and $R^8$ to $R^{11}$ are respectively independently $C_{1-6}$ alkyl groups.)

As the above-mentioned polyalcohol lower alkyl ether (glycol ether), diethylene glycol monobutyl ether, triethylene glycol monobutyl ether, propylene glycol monobutyl ether or dipropylene glycol monobutyl ether can be employed. Of these, triethylene glycol monobutyl ether is particularly preferable.

It is possible to use a commercial product as the acetylene glycol-type surfactant represented by the above general formula (2). As specific examples, SURFYNOL 104, 82, 465, 485 and TG (all available from Air Products and Chemicals, Inc.), and OLFINE STG and OLFINE E1010 (tradenames, manufactured by Nissin Chemical Industry Co., Ltd.) can be mentioned.

It is preferable if an addition amount of the polyalcohol lower alkyl ether is 1 to 30% by weight, and 5 to 20% by weight is more preferable.

An addition amount of the acetylene glycol-type surfactant can be suitably determined, 0.01 to 5% by weight relative to the ink composition being preferable, and a range of around 0.1 to 1% by weight being more preferable.

The wetting agent is preferable for preventing clogging of nozzles of an inkjet printer. Examples of the wetting agent include polyalcohols such as glycerin, ethylene glycol, diethylene glycol, triethylene glycol, tetraethylene glycol, propylene glycol, dipropylene glycol, tripropylene glycol, a polyethylene glycol with a molecular weight of not more than 2,000, 1,3-propylene glycol, isopropylene glycol, isobutylene glycol, 1,4-butane diol, 1,3-butane diol, 1,5-pentane diol, 1,6-hexane diol, meso-erithrytol, pentaerithrytol and the like, glycerine being preferable.

An addition amount of the wetting agent can be suitably determined, around 0.1 to 30% by weight relative to the ink composition being preferable, and around 0.5 to 25% by weight being more preferable.

As the pH regulation agent, potassium hydroxide, sodium hydroxide, triethanolamine and the like can be mentioned. An addition amount of the pH regulation agent is determined in accordance with an intended pH value.

In the ink compositions to be used in an ink set relating to a present embodiment, in accordance with requirements, it is also possible to include additives, such as a fixing agent such as a water-soluble rosin or the like, an anti-fungal agent/preservative such as sodium benzoate or the like, an antioxidant/ultraviolet absorbent such as an allophanate or the like, a chelating agent and so forth.

In the ink set of this invention, in addition to the magenta ink and light magenta ink compositions, usual ink compositions can be included. As such ink compositions, a yellow ink composition and a cyan ink composition are preferable. As components to be used in these ink compositions, it is possible to employ colorants, dispersants and the like that are used in usual ink compositions, without particular limitation.

As colorants of the yellow ink composition and the cyan ink composition, a yellow pigment and a cyan pigment, respectively, can be suitably employed. As the yellow pigment, C.I. Pigment Yellow 74, 93, 109, 110, 128, 138, 150, 151, 154, 155, 180 and 185 and the like are mentioned, and as the cyan pigment, C.I. Pigment Blue 1, 2, 3, 15:3, 15:4, 15:34, 16, 22 and 60, and C.I. Vat Blue 4 and 60 and the like are mentioned.

Furthermore, the ink set of the invention can also include a light cyan ink composition which is formed with a pigment density lower than the pigment density of the cyan ink composition. Combining the magenta ink composition and the light magenta ink composition with the yellow ink composition, the cyan ink composition and the light cyan ink composition is particularly preferable in regard to providing recorded matter with improved granularity. In addition, in accordance with requirements, a black ink composition containing carbon black or the like can be included.

The ink set of the invention can be used in various printing systems, but can be particularly preferably used in an inkjet printing system.

With an inkjet recording method which performs printing by ejecting droplets of the ink compositions and causing the droplets to adhere to a recording medium, if the method uses the above-described ink set of the invention, recorded matter with improved granularity over a broad range, from low-brightness portions to high-brightness portions, can be provided.

EXAMPLES

Now, the present invention will be more concretely described by Examples. First, color ink compositions (ink nos. 1 to 7) and a black ink composition (ink no. 8) were prepared with the compositions and blending amounts described in the following table. The components of the ink compositions shown in Table 1 represent percentages by weight of each component with respect to the overall ink composition. Moreover, in this table, PV19 means C.I. Pigment Violet 19, PR122 means C.I. Pigment Red 122, PY74 means C.I. Pigment Yellow 74, and PB15:3 means C.I. Pigment Blue 15:3. BYK-348 means the silicon-based surfactant BYK-348 marketed by BYK Chemie Japan KK.

TABLE 1

| | Ink No. | | | | | | | |
|---|---|---|---|---|---|---|---|---|
| | Yellow | Cyan | Light Cy | Magenta | | Light Magenta | | Black |
| | 1 | 2 | 3 | 4 | 5 | 6 | 7 | 8 |
| PV19 | | | | 6.00 | | 1.00 | | |
| PR122 | | | | | 6.00 | | 1.00 | |
| PY74 | 5.00 | | | | | | | |
| PB15:3 | | 4.00 | 1.00 | | | | | |
| Carbon Black | | | | | | | | 2.00 |
| Dispersant | 1.50 | 1.20 | 0.30 | 1.80 | 1.80 | 0.30 | 0.30 | 0.60 |
| Glycerin | 16.00 | 13.00 | 22.00 | 11.00 | 11.00 | 22.00 | 23.00 | 15.00 |
| 1,2-Hexane Diol | 5.00 | 5.00 | 5.00 | 5.00 | 5.00 | 5.00 | 5.00 | 5.00 |
| BYK-348 | 0.50 | 0.50 | 0.50 | 0.50 | 0.50 | 0.50 | 0.50 | 0.50 |
| Triethanolamine | 0.90 | 0.90 | 0.90 | 0.90 | 0.90 | 0.90 | 0.90 | 0.90 |
| Pure Water | Remainder | Remainder | Remainder | Remainder | Remainder | Remainder | Remainder | Remainder |
| Total (% by weight) | 100 | 100 | 100 | 100 | 100 | 100 | 100 | 100 |

Using these ink compositions (ink nos. 1 to 7), ink sets A to D were constructed in the combinations shown in the following table. The ink numbers used in this table correspond to the ink numbers in Table 1. The yellow ink composition (Y), cyan ink composition (C) and light cyan ink composition (LC) are the same for each of the ink sets A to D. In addition, in this table, M means the magenta ink composition, LM means the light magenta ink composition and Bk means the black ink composition.

TABLE 2

| | Ink No. | | | | | | Test Example Granularity |
|---|---|---|---|---|---|---|---|
| Ink set | Y | C | LC | M | LM | Bk | |
| A (Example 1) | 1 | 2 | 3 | 4 | 7 | — | A |
| B (Example 2) | 1 | 2 | 3 | 4 | 7 | 8 | A |
| C (Comparative Example 1) | 1 | 2 | 3 | 5 | 6 | — | B |
| D (Comparative Example 2) | 1 | 2 | 3 | 5 | 7 | — | C |

Test Example 1

Evaluation of Granularity

Each of the ink sets A to D described in Table 2 was loaded into a PM4000PX inkjet printer (manufactured by Seiko Epson Corporation), and printed onto an inkjet-dedicated recording medium (PM photographic paper, manufactured by Seiko Epson Corporation). The printing, from a printer driver for that inkjet printer, formed a gradation pattern from white to 100% magenta output. Then, the printed surface of each sample was visually observed and granularity was evaluated by the following criteria. Results are shown in Table 2.

A: Granularity could not be discerned by visual observation from a distance of 30 cm from the printed surface B: Granularity could be discerned in visual observation from a distance of 30 cm from the printed surface C: Granularity could be discerned in visual observation from a distance of more than 30 cm from the printed surface As has been described hereabove, in an ink set that is provided at least with a magenta ink composition and a light magenta ink composition which is formed with a lower pigment density than a pigment density of the magenta ink composition, because a pigment used in the magenta ink composition is C.I. Pigment Violet 19 and a pigment used in the light magenta ink composition is C.I. Pigment Red 122, the present invention can improve granularity of recorded matter images which are recorded at recording mediums.

What is claimed is:

1. An ink set comprising at least a magenta ink composition and a light magenta ink composition, the light magenta ink composition being formed with a pigment density lower than a pigment density of the magenta ink composition,
    wherein a pigment used in the magenta ink composition is C.I. Pigment Violet 19, and a pigment used in the light magenta ink composition is C.I. Pigment Red 122, wherein a ratio of density of the C.I. Pigment Violet 19 used in the magenta ink composition to density of the C.I. Pigment Red 122 used in the light magenta ink composition is in the range 4:3 to 14:1.

2. The ink set according to claim 1, wherein the magenta ink composition and the light magenta ink composition include a dispersant for dispersing the pigment.

3. The ink set according to claim 2, wherein the dispersant comprises one of a resin and a surfactant.

4. The ink set according to claim 1, wherein the magenta ink composition and the light magenta ink composition include a permeation accellerant which raises permeability of the pigment into a recording medium.

5. The ink set according to claim 4, wherein the permeation accellerant comprises at least one of a 1,2-alkane diol and a silicon-based surfactant.

6. The ink set according to claim 1, wherein the magenta ink composition and the light magenta ink composition include a wetting agent.

7. The ink set according to claim 6, wherein the wetting agent comprises a polyalcohol.

8. The ink set according to claim 1, further comprising a yellow ink composition, a cyan ink composition, and a light cyan ink composition.

9. An inkjet recording method for performing printing, the method comprising ejecting droplets of ink compositions and causing the droplets to adhere to a recording medium,
    wherein the ink compositions comprise the ink set according to claim 1.

10. Recorded matter, wherein the recorded matter has been recorded by depositing the ink set according to claim 1 onto a recording medium.

* * * * *